United States Patent [19]

Park

[11] Patent Number: 5,888,668
[45] Date of Patent: Mar. 30, 1999

[54] CAP ASSEMBLY FOR A BATTERY

[75] Inventor: Eun-Sung Park, Seoul, Rep. of Korea

[73] Assignee: Samsung Display Devices Co., Ltd., Kyungki-do, Rep. of Korea

[21] Appl. No.: 866,569

[22] Filed: Jun. 2, 1997

[30] Foreign Application Priority Data

May 31, 1996 [KR] Rep. of Korea ............ 96-19167

[51] Int. Cl.$^6$ .............................................. H01M 2/04
[52] U.S. Cl. ............................................ 429/175; 429/54
[58] Field of Search ........................ 429/175, 54

[56] References Cited

U.S. PATENT DOCUMENTS 5,490,867  2/1996  Kozawa et al. .
5,537,733  7/1996  Kozawa et al. .

FOREIGN PATENT DOCUMENTS 0 172 251  2/1986  European Pat. Off. .

*Primary Examiner*—John S. Maples
*Attorney, Agent, or Firm*—Lowe Hauptman Gopstein Gilman & Berner

[57] ABSTRACT

A cap assembly for a battery has a cap cover in which a gas discharge hole is formed. A cap is installed on the upper end of the cap cover to contain a rubber member disposed between the upper and lower ends of the cap and block the gas discharge hole. The rubber member is hat shaped in the form of a quadrilateral head.

2 Claims, 4 Drawing Sheets

(a)                            (b)

(a)                            (b)

(a)                            (b)

(a)                            (b)

(a)　　　　　　　　　　(b)

CAP ASSEMBLY FOR A BATTERY

BACKGROUND OF THE INVENTION

The present invention relates to a cap assembly of a battery, and more particularly, to a cap assembly of a battery which can effectively discharge a gas generated within the battery.

FIG. 1 is an example of a conventional battery having a hexahedral rubber member. The battery has a cylindrical case 20 in which a roll of anode and cathode plates 21 and 22 having a separator 23 intervened therebetween is placed. The separator 23 insulates the plates 21 and 22. A cap assembly 10 including a cap 12 having a rubber member 14, and a cap cover 11 is installed on the upper portion of the anode and cathode plates 21 and 22. A gasket (not shown) is installed around a portion where the cap 12 contacts the cap cover 11 such that the anode and cathode are insulated and an electrolytic solution is prevented from leaking, to thus protect the battery.

The battery generates electricity through a chemical reaction which causes electrons to flow from the cathode to the anode. When an overcharge occurs, a gas is greatly generated which sharply increases the internal pressure of the battery.

The increase of internal pressure in the battery may cause the case 20 to explode. The cap assembly 10 including the rubber member 14 is installed to prevent the explosion. When the pressure inside the case increases to a predetermined level, the rubber member 14 covering a gas discharge hole 13 of the cap cover 11 becomes separated from the cap cover 11, thereby opening the gas discharge hole 13 to discharge the gas, which prevents the case 20 from exploding.

FIGS. 2, 3 and 4 show different types of conventional rubber members for the cap assembly of the battery shown in FIG. 1, wherein (a) is a sectional view and (b) is a plan view.

FIG. 2 shows a hexahedral rubber member, FIG. 3 shows a hat-shaped rubber member having a cylindrical head, and FIG. 4 shows a rubber member assembly constituted by a spring, a steel plate, and a rubber element.

The rubber member inclines while being inserted into the cap assembly. At this time, if the rubber member inclines to one direction in the cap assembly, a deviation of pressure applied to the bottom portion is generated. Thus, it is natural that, a portion to which less pressure is applied, is more easily lifted. Accordingly, more gas is discharged through the portion to which less pressure is applied.

Such a phenomenon causes a reduction in the durability of the battery by partially curing the rubber member. When the partial cure of the rubber member and the reduction of the battery life become serious with the increase in the deviation of pressure, an appropriate adjustment of pressure deviation is very important to improve the quality of the battery.

In general, it is preferable that the deviation of pressure applied to the bottom surface of the rubber member should be adjusted within the range of 15±2 $kgf/cm^2$.

However, in the case of the hat-shaped rubber member having a cylindrical head or the hexahedral rubber member, a force is not applied uniformly to the bottom surface because of the inclination generated when inserted into the cap assembly, so that the pressure deviation problem becomes more serious.

That is, as shown in FIG. 5(a), if the hexahedral rubber member is biased toward the left side while being inserted into the cap assembly, a force is prone to concentrate only on the lower surface of the left side. This tendency is represented by an arrow.

Also, as shown in FIG. 5(b), if the hat-shaped rubber member having a cylindrical head is biased toward the left side, a force is applied toward the left side, not uniformly applied to the bottom surface of the rubber member. This phenomenon is represented by an arrow.

If a force is biased toward one side, a great amount of gas is discharged through the other side to which relatively less force is applied. Thus, a portion through which a lot of gas is discharged starts being cured earlier than the other portion.

Meanwhile, there is no inclining problem in the rubber member assembly composed of the spring, steel, and rubber element shown in FIG. 4. However, since the above rubber member assembly should be assembled using three different components, it takes many steps and much cost to manufacture the rubber member assembly. Furthermore, the above rubber member assembly is not suitable for a cap assembly of a high voltage battery which generates a lot of gas, due to the elastic limit of the spring.

SUMMARY OF THE INVENTION

To solve the above problems of conventional rubber members, it is an object of the present invention to provide a cap assembly having a rubber member which is capable of preventing deviation of pressure which can be generated due to an inclination of the rubber member during the discharge of gas and enduring a high voltage.

To accomplish the above object, there is provided a cap assembly for a battery comprising:

a cap cover on which a gas discharge hole is formed;

a cap installed on the upper end of said cap cover, for acting as an anode tap; and a rubber member disposed between the upper and lower ends of said cap cover, for blocking said gas discharge hole, wherein said rubber member is in a shape of a hat having a quadrilateral head.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
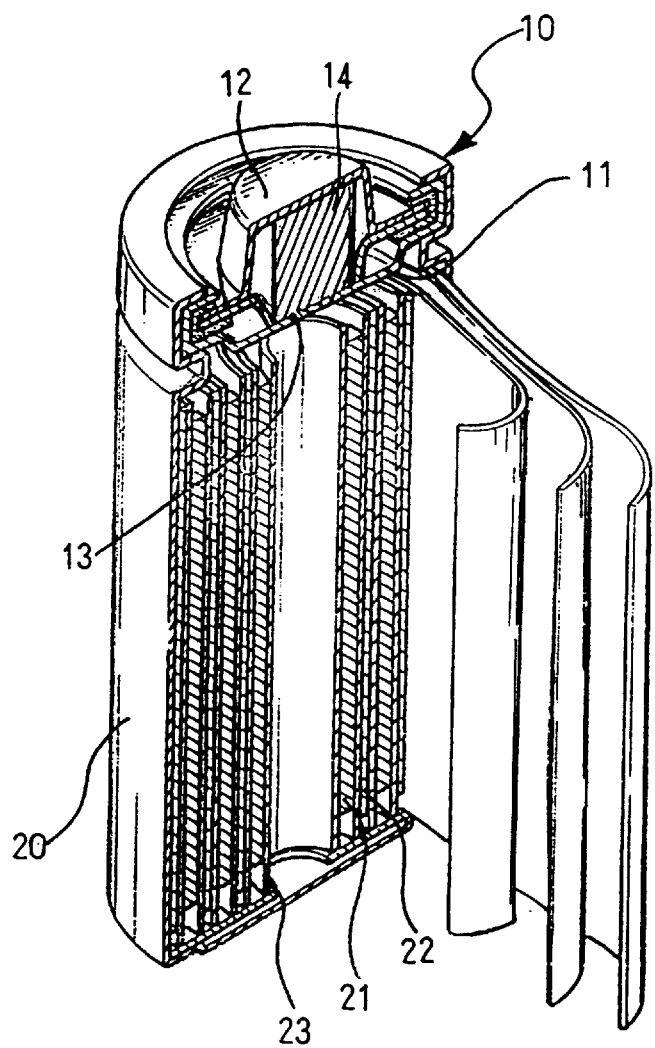
FIG. 1 is a perspective view showing the structure of a conventional battery including a hexahedral rubber member.
Figure 2:
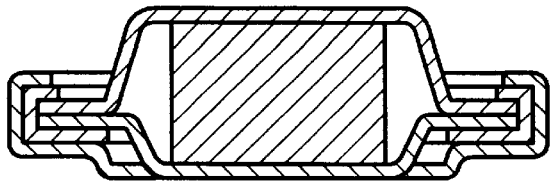
FIGS. 2(a) and (b) are sectional and front views, respectively, each showing a cap assembly in the conventional battery having the hexahedral rubber member.
Figure 2:
Figure 3:
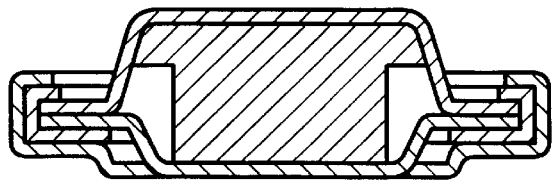
FIGS. 3(a) and (b) are sectional and front views, respectively, each showing a cap assembly in a conventional battery including a hat-shaped rubber member having a cylindrical head.
Figure 3:
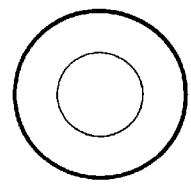
Figure 4:
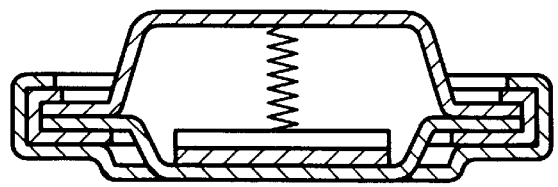
FIGS. 4(a) and (b) are sectional and front views, respectively, each showing a cap assembly in a conventional battery including a rubber member assembly formed by a spring, a steel plate and a rubber element.
Figure 4:
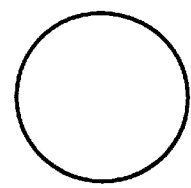
Figure 5:
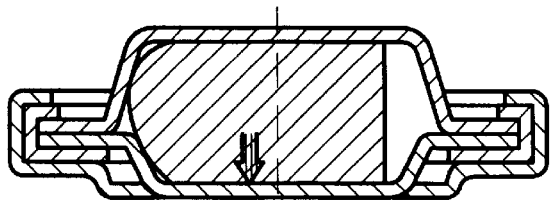
FIG. 5(a) illustrates a distribution state of a force generated due to an inclination when assembling the conventional cap assembly including the rubber member shown in FIGS. 2(a) and (b)
FIG. 5(b) illustrates a distribution state of a force generated due to an inclination when assembling the conventional cap assembly including the rubber member shown in FIGS. 3(a) and (b)
Figure 5:
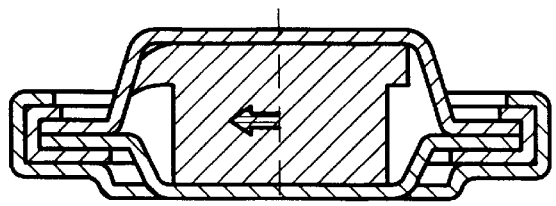
Figure 6:
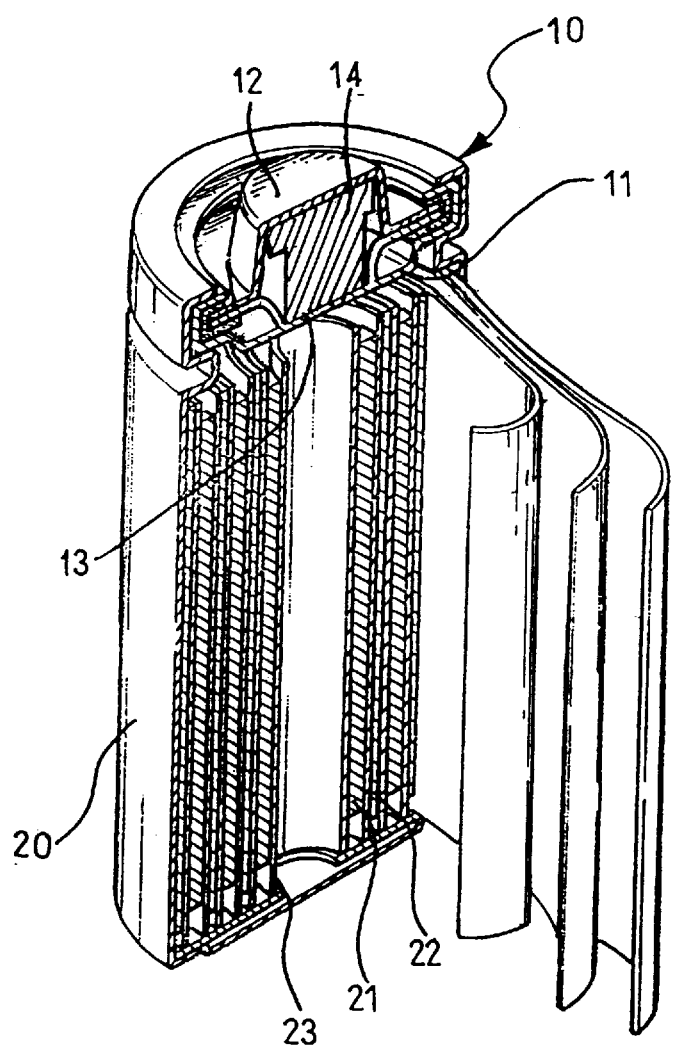
FIG. 6 is a perspective view of a battery including a hat-shaped rubber member having a quadrilateral head according to the present invention.

FIG. 6 is a perspective view showing a cylindrical battery including a cap assembly according to the present invention. As shown in FIG. 6, the battery having the cap assembly according to the present invention is provided with a cylindrical case 20 in which a roll of anode and cathode plates 21 and 22 having a separator 23 intervened therebetween is placed. A cap assembly constituted by a cap cover 11 and a cap 12 having a rubber member 14 is installed on the upper end portion of the roll of the anode and cathode plates 21 and 22. Also, a gasket (not shown) is provided around the contact portion of the cap 12 and the cap cover 11 in order to insulate the anode and cathode and protect the battery by preventing the leakage of an electrolytic solution.

Figure 7:
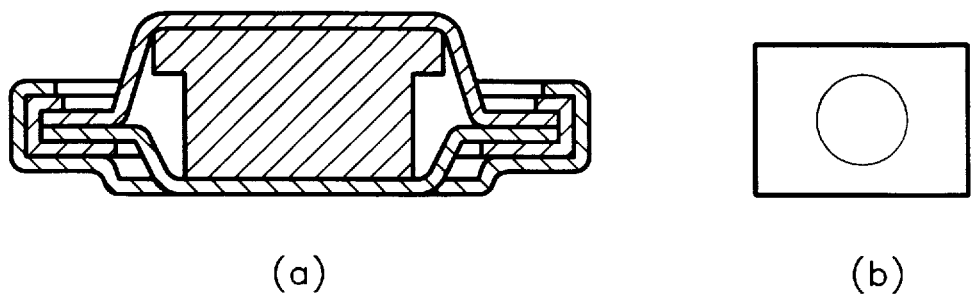
FIGS. 7(*a*) and (*b*) are sectional and front views, respectively, each showing a cap assembly of the battery shown in FIG. 6.
Figure 8:
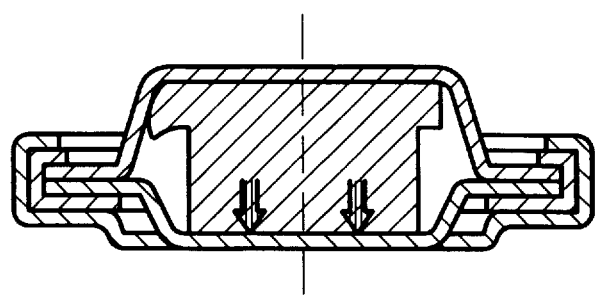
FIG. 8 illustrates a distribution state of a force generated due to an inclination when assembling the cap assembly according to the present invention.

Furthermore, FIGS. 7 (*a*) and (*b*) are sectional and front views, respectively, each showing the cap assembly according to the present invention shown in FIG. 6. FIG. 8 shows a distribution state (which is represented by an arrow) of a force applied to the bottom surface when the rubber member inclines during the assembly of the cap assembly according to the present invention.

Referring to FIG. 8, even though the hat-shaped rubber member having a quadrilateral head inclines when assembling the cap assembly, a uniform force is applied to the bottom surface of the rubber member. Thus, a pressure deviation of a discharged gas is so low that the partial cure of the rubber member can be prevented.

Also, the cap assembly according to the present invention including a hat-shaped rubber member having a quadrilateral head is manufactured through a simple process and at a low cost and can be applied to a high voltage battery as compared to the conventional cap assembly including a rubber member assembly constituted by a spring, a steel plate and a rubber element.

Hereinafter, the effects of the present invention will be described in more detail with reference to an example and a comparative example.

EXAMPLE

One hundred batteries are manufactured using the cap assembly including a hat-shaped rubber member having a quadrilateral head.

A pressure control range of the rubber member is measured with varying the inner pressure of the battery. Then, a failure rate is measured by counting the number of batteries going beyond a range of 15±2 kgf/cm$^2$.

Also, charge and discharge for the battery are repeated and the number of charge and discharge cycles when the rubber member starts being cured is measured to record as the life of the battery.

The results are represented in the following table.

Comparative Example

One hundred batteries are manufactured using a cap assembly including a rectangular hexahedral rubber member.

A failure rate and the life of the battery are measured in the same manner as that of the above example. The results of the above comparative example are also represented in the following table.

TABLE 1

|  | the number of batteries going beyond a pressure control range of 15 ± 2kgf/cm$^2$ | the number of charge and discharge cycles when the rubber member starts being cured |
|---|---|---|
| example | 4 | about 1000 |
| comparative example | 10 | about 500 |

As can be seen from the results, when a battery employs the conventional cap assembly including the hexahedral rubber member, 10% of the batteries go astray of the predetermined pressure control range and reach a range of 15±4 kgf/cm$^2$ (i.e., a failure rate is 10%). On the other hand, in case that a battery employs the cap assembly including the hat-shaped rubber member having a quadrilateral head according to the present invention, the remaining batteries other than four are within the predetermined pressure control range (i.e., a failure rate is 4%).

Furthermore, in the case of the conventional cap assembly, the rubber member starts being cured after about 500 charge and discharge cycles so that the life of the battery is greatly reduced. However, in case of the cap assembly according to the present invention, the rubber member doesn't start to be cured until the number of charge and discharge cycles reaches 1,000.

Accordingly, in the hat-shaped rubber member having a quadrilateral head according to the present invention, even though the inclination of the rubber member occurs, a force is applied evenly to the bottom surface thereof, thereby preventing a partial cure. Thus, the cap assembly according to the present invention is advantageous in that the life of a battery is greatly extended and production yield thereof is also improved.

What is claimed is:

1. A cap assembly for a battery comprising:

a cap cover on which a gas discharge hole is formed;

a cap installed on an upper end of said cap cover to function as a gas trap; and a rubber member disposed between upper and lower ends of said cap to block said gas discharge hole;

wherein said rubber member has a polygonal shaped cross section in an upper portion thereof and a cross section of a different shape in a lower portion thereof;

wherein said upper portion is configured such that, when disposed in symmetry in a chamber defined by walls of said cap, only a top surface of the upper portion contacts the walls.

2. The cap assembly for a battery according to claim 1, wherein said polygon shape is a rectangular shape.

* * * * *